Oct. 1, 1957 R. T. JENKINS ET AL 2,808,463

TELEPHONE SIGNALING DEVICE

Filed June 7, 1956 3 Sheets-Sheet 1

INVENTORS R. T. JENKINS
R. E. POLK
BY John C. Morris
ATTORNEY

Oct. 1, 1957 R. T. JENKINS ET AL 2,808,463

TELEPHONE SIGNALING DEVICE

Filed June 7, 1956 3 Sheets-Sheet 2

INVENTORS R. T. JENKINS
R. E. POLK

BY John C. Morris

ATTORNEY

TELEPHONE SIGNALING DEVICE

Filed June 7, 1956 3 Sheets-Sheet 3

FIG. 5A

CENTRAL OFFICE SIGNAL POWER

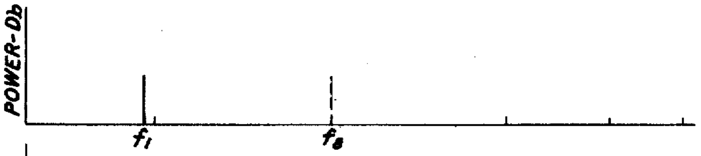

FIG. 5B

SIGNAL RECEIVED AFTER AMPLIFICATION AND HARMONIC GENERATION

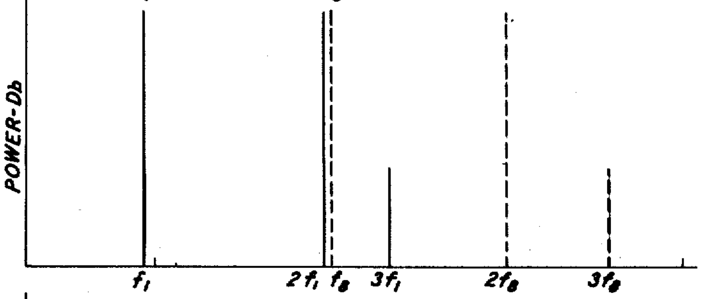

FIG. 5C

TRANSDUCER RESPONSE CHARACTERISTIC

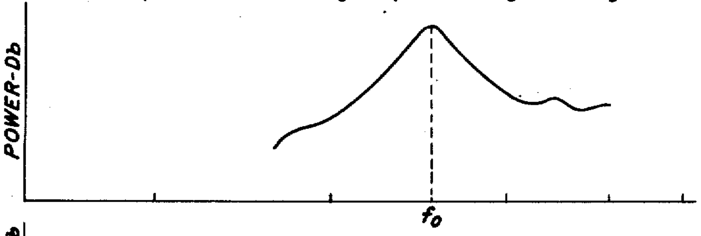

FIG. 5D

RESONATOR RESPONSE CHARACTERISTIC

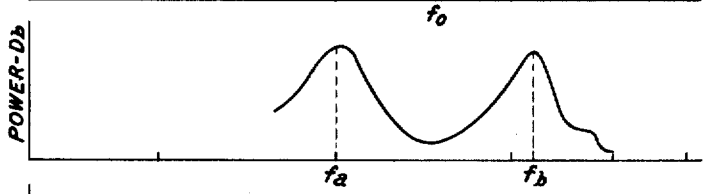

FIG. 5E

SIGNALLING DEVICE RESPONSE CHARACTERISTIC (FIG. 5C PLUS FIG. 5D)

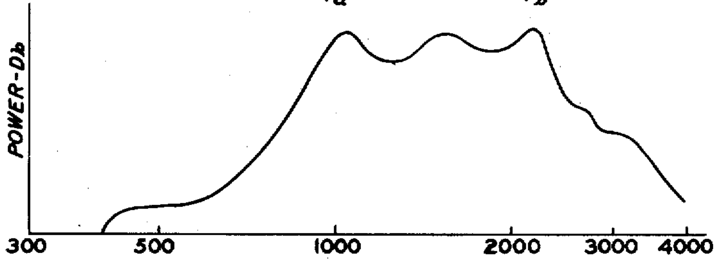

FIG. 5F

AUDIBLE SIGNAL CHARACTERISTIC

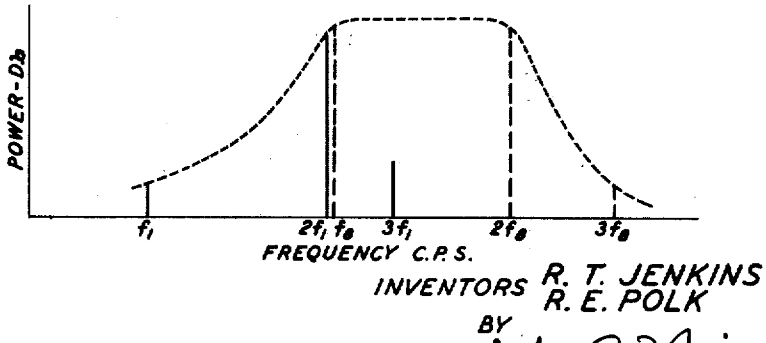

INVENTORS R. T. JENKINS
R. E. POLK
BY John C. Morris
ATTORNEY 2,808,463

TELEPHONE SIGNALING DEVICE

Reginald T. Jenkins and Robert E. Polk, Summit, N. J., assignors to Bell Telephone Laboratories, Incorporated, New York, N. Y., a corporation of New York Application June 7, 1956, Serial No. 589,901

12 Claims. (Cl. 179—84)

This invention relates to telephone substation apparatus and more particularly to audible subscriber signaling devices.

Telephone subscriber signaling systems heretofore have generally employed a generator at the telephone central office producing a 90 volt, 20 cycle per second ringing signal which is transmitted over the telephone line and activates the ringer at the subscriber station producing the familiar sound of the telephone bell. Throughout the many years and countless subscriber installations, the use of bell or gong signaling has proved satisfactory. Two deficiencies, however, have been encountered and are worthy of note. One is that, with the numerous other signaling devices employing bells such as doorbells, alarm clocks and home fire alarms, frequently subscribers have had difficulty in distinguishing the telephone bell from any of these other signals resulting in obvious inconveniences. A second difficulty occurs due to the gradual impairment in hearing acuity of humans with increased age.

Studies of the hearing acuity of large segments of the population have been reported for example in Technical Aspects of Sound, E. G. Richardson, volume 1, page 251 (Elsevier 1953). Most notable in the findings reported is that large numbers of men over fifty years of age suffer a 15 to 25 decibel hearing loss at frequencies above 2000 cycles per second. Since most of the frequency components of the sound of the conventional telephone bell are above 2000 cycles per second, an appreciable number of the population encounters some difficulty in hearing the telephone bell at any distance or in the presence of masking noise.

In addition to these difficulties involving conventional bells, with the advent of low voltage electronic switching telephone systems of the type disclosed in the patent application of B. G. Bjornson et al., Serial No. 334,552, filed February 2, 1953, the necessity of providing a compatible signaling system arises. Such systems employing transistors as disclosed in the above-identified patent application are designed with a signal voltage in the order of 1 volt alternating current and a direct current power supply of 20 volts. Of course, the transmission of a 90 volt ringing signal over such a system is not feasible.

One solution proposed is that a conventional ringer be employed having a local power source on the subscriber's premises and that the power source be triggered by a low voltage signal from the telephone central office. Such a proposal has the disadvantage of requiring additional power equipment at each substation with a resultant increase in cost and more important the reliability of the entire telephone system would be limited by the reliability of the local power source at all subscriber stations.

A more useful proposal which provides in addition the selective ringing of several subscribers over a single line is described in the patent application of L. A. Meacham and F. West, Serial No. 469,633, filed November 18, 1954. In this proposal, the telephone substation set includes a frequency selective circuit or narrow band-pass filter connected to the telephone line and to a transistor amplifier. The filter attenuates calling signals arriving over the line at frequencies other than the one assigned to that particular party. Exemplary signaling frequencies for an eight-party line are 478, 532, 591, 656, 729, 810, 900 and 1000 cycles per second. The signal at the particular subscriber's frequency is amplified by the transistor amplifier which is biased for class C operation whereby the amplifier output is rich in harmonics of the signaling frequency. The amplifier as proposed by the Meacham-West application is used to drive a loudspeaker having a diaphragm which is coupled to the surrounding air by a horn.

It has been found, however, that loud speakers both of the direct radiating and horn loaded type are of such size that mounting within a telephone desk set is definitely impractical. It is possible to mount transducers coupled to a folded horn within a telephone desk set so that sound is radiated out of the bottom of the set. The complexity of design and resultant disproportionate cost along with the poor acoustic coupling to the surrounding air via the bottom of the desk set limits the utility of such an arrangement.

It is an object of this invention to provide an acoustic signaling device capable of producing a distinctive musical tone in the range of frequencies to which the human ear is particularly sensitive, to wit, 1000 to 2000 cycles per second.

Another object of this invention is to provide an audio reproducer of small size and low cost capable of producing an audible signal of pleasing quality and easily distinguishable from other audible signaling devices normally found at telephone subscriber installations.

Still another object of this invention is to enable the signaling of telephone subscribers over low voltage telephone systems with an audible signal of acoustic output at least equal in energy to that of a conventional telephone ringer yet requiring only a fraction of the ringer's operating power.

These and other objects are accomplished in accordance with this invention, one embodiment of which comprises a transducer of the telephone receiver type having a peripherally secured diaphragm which is virtually undamped in its resonant frequency. Secured to the transducer on one side of the diaphragm is an enclosure or baffle. On the other side of the diaphragm secured to the transducer frame is a composite acoustic resonator including a pair of tubular sections of different diameters arranged in tandem. The smaller tubular section is acoustically coupled to the diaphragm and the larger section is secured to and similarly coupled to the end of the smaller section. The assembly is arranged for mounting within a telephone desk set with the open end of the larger section of the resonator adjacent to an opening in the side of the desk set housing and coupled to the surrounding air therethrough.

One feature of this invention involves the combination of an electromechanical transducer and an acoustic resonator as a telephone signaling device.

Another feature of this invention involves the correlation of transducer characteristics and resonator dimensions to obtain a signaling device having high response to a predetermined limited range of frequencies to which the human ear is particularly sensitive.

Still another feature of this invention relates to the composite design of the resonator structure whereby a simple structure provides enhanced response at two distinct predetermined frequencies.

A complete understanding of these and other features of this invention may be derived from the following detailed description of an illustrative embodiment of it and by reference to the drawing in which.

Figure 2:
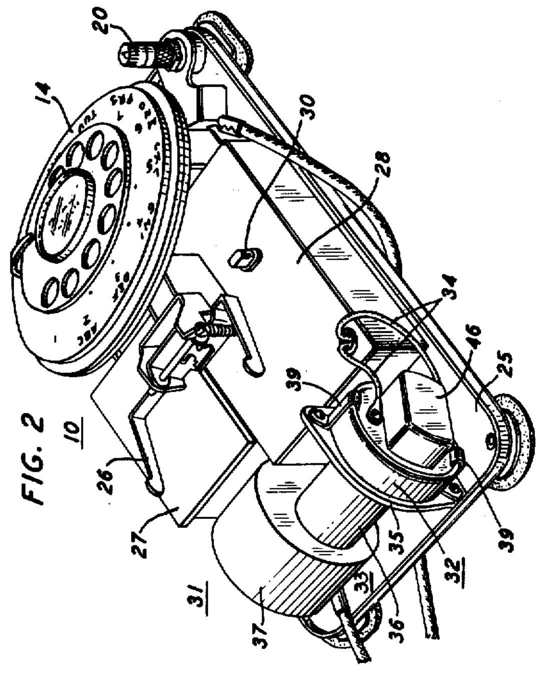
Fig. 2 is a perspective view of the telephone subset of Fig. 1 with the housing removed and the signaling device shown in the foreground.
Figure 6:
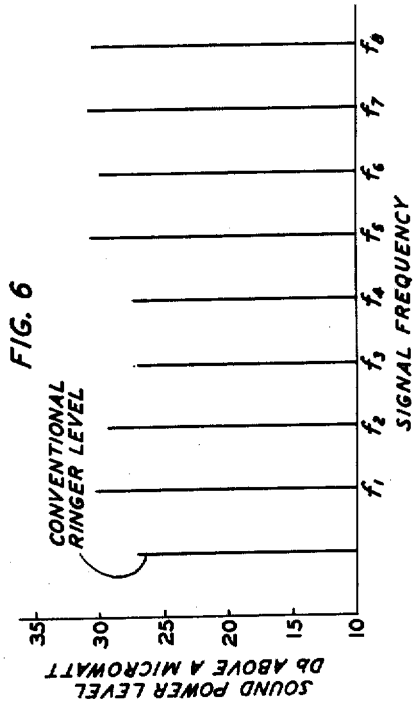
Figure 3:
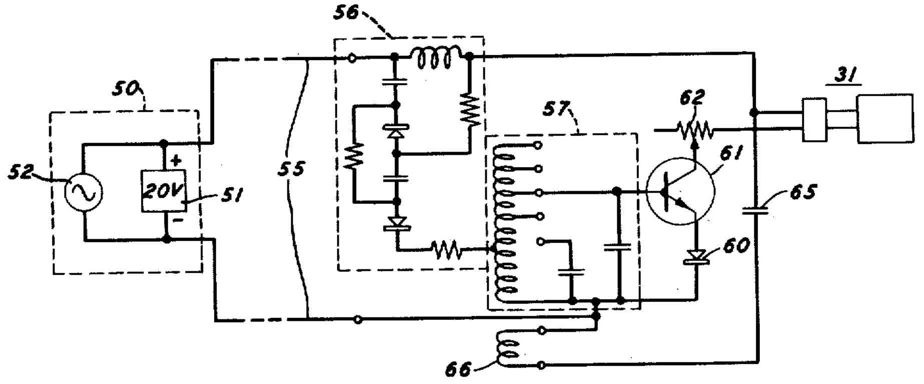
Figure 4:
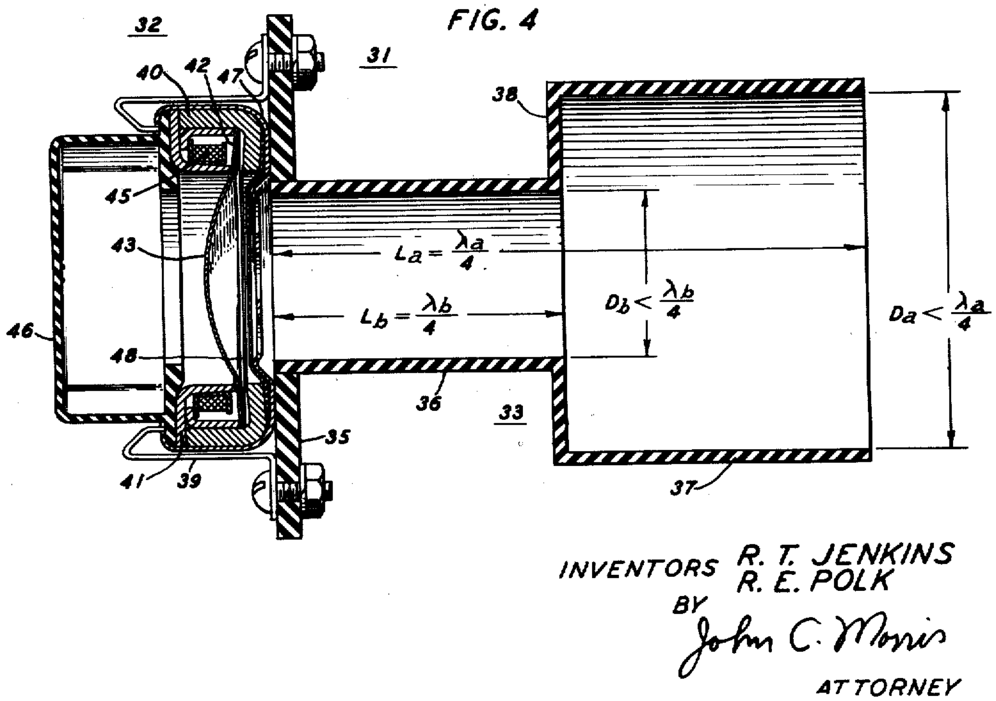

Fig. 3 is a schematic representation of the multiparty frequency selective signaling system of the application of L. A. Meacham-F. West, previously identified, including a signaling device in accordance with this invention;

Fig. 4 is an elevational view in section of the acoustic signal shown in Fig. 2;

Fig. 5, including parts A through F is a graphical representation of the frequency response of the acoutic signal of this invention in relationship to the electrical input and acoustic output signal frequencies; and Fig. 6 is a graphical representation of the sound power output of the acoustic signal of this invention for each of several subscriber's signal frequencies as compared with the power output of a conventional bell type ringer.

Figure 1:
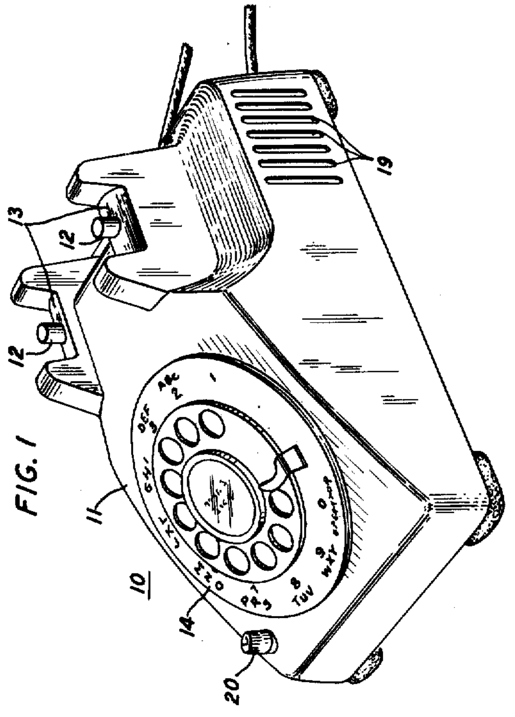
Fig. 1 is a perspective view of a telephone subset incorporating an acoustic signaling device of this invention.

Referring now to Fig. 1, a telephone desk set 10 may be seen including a housing or cover 11 having a pair of switch hook plungers 12 emerging through a cradle portion 13, and having a dial or calling device 14 on the sloping front wall. Below the calling device is a knob 20 which controls the setting of a volume control for the acoustic signaling device contained within the desk set 10. On the side of the housing 11 are a plurality of slots 19 forming an opening through which the acoustic signal may be heard.

In Fig. 2, the telephone set 10 of Fig. 1 may be seen with the housing 11 removed. A switch hook 26 for association with the plungers 12 of Fig. 1 along with a transmission network package 27, a party selection and signal amplifier network 28, and the signaling device 31 of this invention, are mounted on a base 25. A transistor 30 which serves as the amplifier and for amplitude gating as well as harmonic generation of the audible signal may be seen plugged into the package 28. Leads 34 from the network 28 are connected to the voice coil terminals of a transducer 32 of the signaling device 31.

The signaling device 31 includes the transducer 32 and an acoustic resonator 33 having an end plate 35 with an aperture in the region of the transducer diaphragm and a pair of tandem tubes 36 and 37. The end plate 35 of the resonator 33 is secured to transducer 32 by a pair of Z-shaped brackets 39. Although the preferred arrangement of tubes 36 and 37 is in tandem on a common axis, it has been found that a marked departure from the coaxial condition is permissible without any appreciable degradation in response. This permits a great degree of freedom in mounting the signaling device within a limited space as is apparent in Fig. 2.

The acoustic signaling device 31 has an overall length of approximately four inches and a breadth of approximately two inches, whereby it may be positioned at the rear of the desk set in the space heretofore occupied by a conventional ringer.

In its intended use, the signaling device of this invention may be employed in connection with the telephone signaling system of the noted L. A. Meacham-F. West application, the circuit of which is shown in Fig. 3. It comprises generally a telephone central office 50 having a direct current supply 51 and a subscriber signal generator 52 which is capable of producing any of several single frequency signals dependent upon which of the several parties on the telephone line is intended to be called. Connected to one side of a telephone line 55 at a subscriber's station is a current limiter 56 so arranged that the alternating current signal does not exceed the direct current at the subscriber's station. Connected to the current limiter 56 and to the other side of the telephone line 55 is a filter network 57 including an inductor having several taps and one or two capacitors in parallel. The particular tap to which the one or more capacitors is connected determines the antiresonant frequency of the network and thereby the frequency to which the signaling device will respond. One side of the filter network 57 is connected through a biasing diode 60 to the emitter electrode of a transistor 61 operated as a class C amplifier. The other side of the filter network 57 is connected to the base electrode of the transistor 61. The acoustic signaling device 31 of this invention is connected between a volume control 62 in the collector circuit of transistor 61 and one side of the telephone line 55. One terminal of the signaling device 31 is also connected through a filter capacitor 65 and an inductance 66 in a feedback loop to the filter network. As so arranged, an alternating current signal from the central office 50 as well as the central office direct current is applied to the telephone line 55. The alternating signal at the subscriber's station is limited by the current limiter 56. The filter network 57 is responsive only to this particular subscriber's assigned frequency to increase the voltage of the base electrode of the transistor 61 sufficiently to overcome the bias furnished by the diode 60 and to allow pulses of collector current to flow through the signaling device 31. Due to the operation of the biasing diode 60, the amplifier is in class C operation whereby a multitude of harmonics of the single input frequency are generated. The energy distribution of the acoustic output is in the order of 40 percent fundamental, 40 percent second harmonic, 15 percent third harmonic, and the remainder in higher harmonics. The fundamental, second and third harmonics furnish substantially all of the energy in the operating range of the signaling devices so no consideration of higher harmonics is necessary.

The structure of the signaling device is shown in Fig. 4. The transducer comprises a ring-shaped magnet 40 having a pole piece 41 defining an annular air gap therewith and a domed diaphragm 43 carrying an annular armature 42 positioned in the air gap. A winding 45 lies around the pole piece to produce a varying magnetic flux in the air gap which results in movement of the armature 42 and its diaphragm 43. On the domed side of the diaphragm 43 is a cap 46 which encloses approximately 9 cubic centimeters of air space behind the diaphragm. The cap 46, pole piece 41, and magnet 40 are secured together by a cup-shaped grid 47 with a ferrule portion crimped over the rim of the cap 46. A moistureproof membrane 48 is positioned over the diaphragm 43 under the grid 47 in a conventional manner for telephone receivers.

The diaphragm comprises an annular sheet of a magnetic material such as an iron-cobalt-vanadium alloy known as vanadium Permandar across the central portion of which is connected a light weight dome of, for example, aluminum or impregnated fabric. In one particular application, the diaphragm has a mass M of 0.04 gram and a stiffness S of $40(10^6)$ dynes per centimeter. As may be determined from the equation $$f=\frac{1}{2\pi}\sqrt{\frac{S}{M}}$$

the resonant frequency $f$ of this particular diaphragm determined by its mass and stiffness is in the order of 1520 cycles per second.

Of course, by employing a material of greater stiffness or lesser mass, the resonant frequency may be increased. On the other hand, the resonant frequency may be decreased by opposite changes. It is desirable, that for operation in the range of greatest hearing acuity, the natural frequency of the diaphragm fall between 1000 to 2000 cycles per second.

The transducer is secured by Z-shaped brackets 39 to resonator end plate 35. In acoustic coupling relationship to the diaphragm is the first tubular section 36 of the resonator 33. It is open at both ends and has a length equal to one quarter wavelength of a frequency above that of the resonant frequency of the diaphragm, more particularly, a frequency in the order of 2000 cycles per second. The diameter or transverse dimension of the first tubular section 36 is less than its length and consequently small compared with the wavelength of sound at its resonant frequency. Coupled to the outer end of the tubular member 36 by a flange 38 is the second tubular member 37 which has a diameter larger than that of the first tubular section 36 whereby to all intents and purposes at 2000 cycles per second the loading effect of the second tubular member 37 is small. Therefore, the first tubular member 36 is in effect coupled directly to the air at that frequency. The second tubular member 37 is of sufficient length that when combined with the length of the tubular member 36 the total length is equal to a quarter wavelength of a frequency below the resonant frequency of the diaphragm, and, more particularly, in the order of 1000 cycles per second. The diameter of both members 36 and 37 is small compared with the wavelength of sound at 1000 cycles per second. At this frequency, the composite assembly appears to constitute a single quarter wavelength tube. The lengths and transverse dimensions of the composite resonator may be chosen to produce the desired band of operation of the acoustic signal. As pointed out above, the most useful band for this purpose is 1000 to 2000 cycles per second. With a transducer having a definite resonant response characteristic centered at about 1500 cycles per second, the maximum quantity of energy is converted from electrical to acoustical energy at or about that frequency, and, by the proper choice of the resonator dimensions, the response of the remainder of the band desired may be enhanced.

The frequency-dimension relationships of the preferred embodiment of this invention shown in Fig. 4 are determined from the equation $$\lambda=\frac{c}{f}$$

where $\lambda$=wavelength in centimeters, $c$=34,400 cm./sec.=the velocity of sound in air at 20° centigrade, and $f$=the frequency of the wave in cycles per second.

From this equation, the predetermined boundary determining frequencies $f_a$ and $f_b$, to wit, 1000 and 2000 cycles per second, have wavelengths of $\lambda_a=34.4$ centimeters and $\lambda_b=17.2$ centimeters, respectively. The dimensions of the resonator which are all functions of one quarter wavelength of these frequencies are as follows for this specific illustrative embodiment of our invention:

*Resonator*

| | Length | Diameter |
|---|---|---|
| Smaller Section | $L_b=\frac{\lambda_b}{4}=4.3$ cm. | $D_b<\frac{\lambda_b}{4}$ or <4.3 cm. |
| Combined Sections | $L_a=\frac{\lambda_a}{4}=8.6$ cm. | |
| Larger Sections | $L_a-L_b$ | $D_a<\frac{\lambda_a}{4}$ or <8.6 cm. |

The response of the subscriber's signal means is explained in connection with Fig. 5. In Fig. 5A, the power and the frequency distribution of a signal from the central office as applied to a telephone line serving eight parties are shown. The line $f_1$ indicates the lowest and $f_8$ the highest subscriber signal frequency. The signal frequencies of the other six parties fall between these values. The output of the transistor amplifier to the appropriate ringing signal of parties one and eight is shown in Fig. 5B. The fundamental of frequency $f_1$ is amplified and the second and third harmonics are present. The same is true for party eight. It is noted that the signal frequencies from the central office are all below the range of useful frequency response of the transducer which is shown in Fig. 5C. Acoustic resonator 33 which is coupled to the transducer 32, however, has a frequency response characteristic as shown in Fig. 5D with one peak below that of the transducer and one above. These peaks are labeled $f_A$, $f_B$. The spacing of these peaks, as previously indicated, is determined by the dimensions of the resonator. The characteristic of the assembly of the transducer and the resonator is shown in Fig. 5E having a reasonably uniform response in the limited range of from 900 to 2500 cycles per second.

In Fig. 5F, the output of the signaling device at subscriber stations one and eight in response to their signals is shown as well as the envelope of the maximum output for all of the eight parties. This envelope appears as a dotted line having a flat top extending between 1000 and 2000 cycles per second and falling off rapidly both above and below those values. From this figure, it may be seen that by employing the same resonator structure in all of the substation installations, each of the eight parties may be selectively called and will hear audible signals of substantially the same character and volume. The total power output at each subscriber's station as compared with a conventional ringer may be seen in Fig. 6. In all cases, despite some slight variation from the frequency of one party to the next, the sound power output is at least equal to that of the conventional ringer in a telephone set.

By way of comparison, the power used to operate a conventional ringer is of the order of 250 milliwatts, of which acoustic power in the order of 27 decibels above a microwatt or 0.5 milliwatt is radiated from the telephone set. The efficiency of transformation from these values is 0.2 percent. In contrast to the conventional ringer, the normal power input to telephone signaling devices of this invention is 10 milliwatts from which an acoustic output of 29.5 decibels or 0.8 milliwatt above a microwatt is produced. The efficiency for this signaling device is in the order of 8 percent. This invention, operating at approximately one twenty-fifth of the conventional ringer power, produces a greater acoustic output. In terms of efficiency, it offers an improvement of forty to one.

Therefore, despite the use of low power level signaling from the central office, greater total acoustic energy is radiated into the air at the subscriber's station and this energy is distributed in a frequency range of high sensitivity for the human ear.

Of similar importance is the fact that the signaling device is of simple design, small in volume and easily mounted within the telephone set.

It is to be understood that the above-described arrangements are illustrative of the application of the principles of the invention. Numerous other arrangements may be devised by those skilled in the art without departing from the spirit and scope of the invention.

What is claimed is:

1. An acoustic signaling means comprising a substantially undamped diaphragm, means for vibrating the diaphragm at its natural frequency, a resonator coupled to said diaphragm, said resonator comprising a first section acoustically coupled directly to the diaphragm and a second section coupled to the first section, said first section having a resonant frequency above that of the diaphragm and the combined sections having a resonant frequency below that of the diaphragm, said second section having a greater diameter than the first section to avoid loading of the first section at the resonant frequency of the first section, the diaphragm and resonator frequencies covering substantially the range from 1000 to 2000 cycles per second.

2. A telephone signaling device comprising an electromechanical transducer including a diaphragm, means for mounting said diaphragm for virtually undamped vibration at its resonant frequency, and an acoustic resonator coupling said diaphragm to the surrounding air, said resonator including two discrete open ended sections in tandem defining two resonant frequencies, the resonant frequencies of said diaphragm and said resonator defining an output frequency range of 1000 to 2000 cycles per second for said signaling device.

3. A telephone signaling device comprising an electromechanical transducer including a diaphragm, means for mounting said diaphragm for virtually undamped vibration at its resonant frequency, and an acoustic resonator coupling said diaphragm to the surrounding air, said resonator having two discrete resonant frequencies embracing the resonant frequency of said diaphragm and defining the range of efficient response of said signaling device.

4. A telephone signaling device comprising an electromechanical transducer including a diaphragm having a resonant frequency of vibration between 1000 and 2000 cycles per second, means for mounting said diaphragm for virtually undamped vibration at its resonant frequency, and a quarter wavelength resonator acoustically coupled to said diaphragm, said resonator including a pair of discrete sections, one of said sections and the entire resonator each having pronounced resonant frequencies embracing the resonant frequency of said diaphragm and determining the range of efficient response of said signaling device.

5. The signaling device in accordance with claim 3 wherein the resonant frequency of said one section is in the order of 2000 cycles per second and the resonant frequency of said entire resonator is in the order of 1000 cycles per second.

6. A telephone signaling device comprising an electromechanical transducer including a diaphragm having a resonant frequency in the range of from 1000 to 2000 cycles per second, means including an enclosure on one side of said diaphragm for mounting said diaphragm for virtually undamped vibration at its resonant frequency, means for driving said diaphragm, and a resonator acoustically coupled to the opposite side of said diaphragm, said resonator comprising a first open tubular member having one end positioned in spaced juxtaposition with said diaphragm and a second tubular member positioned in tandem with said first tubular member whereby said first tubular member alone constitutes a quarter wavelength resonator tube at a frequency above the natural frequency of vibration of said diaphragm and said first and second tubular members constitute together a quarter wavelength resonant tube at a frequency below the natural frequency of said diaphragm.

7. The combination in accordance with claim 3 wherein said second tubular member is of substantially greater transverse dimension than said first tubular member whereby said second tubular member effects only slight loading upon said first tubular member at the resonant frequency of said first tubular member.

8. The combination in accordance with claim 5 wherein said first tubular member has a length equal to one quarter wavelength and a transverse dimension less than one quarter wavelength of a frequency in the order of 2000 cycles per second.

9. The combination in accordance with claim 7 wherein said first and second tubular members have a combined length equal to one quarter wavelength of a frequency in the order of 1000 cycles per second.

10. The combination in accordance with claim 8 wherein said second tubular member has a transverse dimension having a value between one quarter wavelength of 1000 and 2000 cycles per second.

11. A telephone signaling device comprising an electromechanical transducer including a diaphragm and a resonator acoustically coupled to said diaphragm, said resonator including in tandem a first tubular section having a length equal to one quarter wavelength of a first predetermined frequency and a second tubular section, the combined length of said first and second tubular sections being equal to one quarter wavelength of a second predetermined frequency and said electromechanical transducer having a peak frequency output lying between said first and second predetermined frequencies, whereby a broad band audible output is produced.

12. A telephone signaling device adapted to produce a broad band acoustic signal of an audible level from a single frequency electrical input and harmonics thereof comprising a transducer including a diaphragm, said transducer having an output characteristic including a pronounced resonant peak, a first tubular resonator of uniform diameter acoustically coupled to said transducer and having a length equal to one quarter wavelength of a first predetermined frequency, and a second tublular resonator of uniform diameter acoustically coupled to said first resonator, the combined length of said first and second resonators being equal to one quarter wavelength of a second predetermined frequency, the resonant peak frequency of said transducer lying between said first and second predetermined frequencies and all said frequencies lying within the range of substantially from 1000 to 2000 cycles per second.

No references cited.

UNITED STATES PATENT OFFICE

CERTIFICATE OF CORRECTION

Patent No. 2,808,463 October 1, 1957

Reginald T. Jenkins et al.

It is hereby certified that error appears in the printed specification of the above numbered patent requiring correction and that the said Letters Patent should read as corrected below.

Column 7, line 50, for the claim reference numeral "3" read -- 5 --.

Signed and sealed this 19th day of November 1957.

(SEAL)
Attest:

KARL H. AXLINE
Attesting Officer

ROBERT C. WATSON
Commissioner of Patents